United States Patent
Shaw et al.

(10) Patent No.: US 10,225,795 B2
(45) Date of Patent: Mar. 5, 2019

(54) RESOURCE-SENSITIVE TOKEN-BASED ACCESS POINT SELECTION

(71) Applicant: AT&T INTELLECTUAL PROPERTY I, L.P., Atlanta, GA (US)

(72) Inventors: Venson Shaw, Kirkland, WA (US); Mark Easley, Frisco, TX (US); Sangar Dowlatkhah, Johns Creek, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 188 days.

(21) Appl. No.: 14/680,992

(22) Filed: Apr. 7, 2015

(65) Prior Publication Data

US 2016/0302140 A1    Oct. 13, 2016

(51) Int. Cl.
    *H04W 48/20* (2009.01)
(52) U.S. Cl.
    CPC ................................. *H04W 48/20* (2013.01)
(58) Field of Classification Search
    CPC ............................ H04W 72/042; H04W 48/20
    See application file for complete search history.

(56) References Cited

U.S. PATENT DOCUMENTS

| | | | |
|---|---|---|---|
| 7,173,926 B2 | 2/2007 | Baltes | |
| 7,218,930 B2 | 5/2007 | Ko et al. | |
| 7,248,841 B2 | 7/2007 | Agee et al. | |
| 7,590,086 B2 | 9/2009 | Olkkonen et al. | |
| 7,948,951 B2 * | 5/2011 | Wentink | H04B 7/2126 370/338 |
| 8,098,622 B2 * | 1/2012 | Yeo | H04W 72/1252 370/310 |
| 8,185,127 B1 * | 5/2012 | Cai | H04W 28/18 455/405 |
| 8,254,942 B2 * | 8/2012 | McBeath | H04W 72/04 370/319 |
| 8,316,434 B2 | 11/2012 | Muhamed et al. | |

(Continued)

FOREIGN PATENT DOCUMENTS

AU    755614    12/2002

OTHER PUBLICATIONS

US 8,089,898, 01/2012, Raleigh (withdrawn)

(Continued)

*Primary Examiner* — Raj Jain
*Assistant Examiner* — Andrew C Lee
(74) *Attorney, Agent, or Firm* — Amin, Turocy & Watson, LLP

(57) ABSTRACT

Resource-sensitive token-based access point selection is disclosed. A user equipment (UE) can generate a request for resources that can be shared with an selection component remote from the UE. The request for resources can be generated independent of the UE receiving information about an access point (AP) in range of the UE. The selection component can pair the UE with an AP resource based on AP data and UE data. The selection component can generate a token comprising information related to the pairing. The UE can receive the token via a device other than the AP or via the AP. The token can be employed by the UE to initiate a link to the AP to enable use of the AP resource by the UE. The link can be resource sensitive in view of the request for resources and available AP resources.

20 Claims, 10 Drawing Sheets

(56) References Cited

U.S. PATENT DOCUMENTS

| | | | | |
|---|---|---|---|---|
| 8,346,225 B2* | 1/2013 | Raleigh | H04L 41/0806 | 370/230 |
| 8,452,302 B2* | 5/2013 | Rahman | H04W 72/085 | 455/452.1 |
| 8,515,437 B2* | 8/2013 | Okuda | H04W 72/085 | 370/328 |
| 8,526,360 B1* | 9/2013 | Breau | H04W 4/18 | 370/328 |
| 8,527,662 B2 | 9/2013 | Biswas et al. | | |
| 8,555,352 B2* | 10/2013 | Moisand | H04L 12/185 | 726/5 |
| 8,571,222 B1 | 10/2013 | Perry et al. | | |
| 8,638,735 B2* | 1/2014 | Holt | G07F 17/32 | 370/329 |
| 8,639,260 B2 | 1/2014 | Fox et al. | | |
| 8,787,309 B1* | 7/2014 | Bharghavan | H04W 36/18 | 370/331 |
| 8,848,608 B1 | 9/2014 | Addepalli et al. | | |
| 8,903,452 B2 | 12/2014 | Raleigh | | |
| 2003/0050070 A1 | 3/2003 | Mashinsky et al. | | |
| 2004/0128345 A1 | 7/2004 | Robinson et al. | | |
| 2006/0221933 A1* | 10/2006 | Bauer | H04W 28/18 | 370/352 |
| 2009/0046642 A1* | 2/2009 | Damnjanovic | H04L 47/24 | 370/329 |
| 2009/0196219 A1* | 8/2009 | Chin | H04L 12/42 | 370/328 |
| 2010/0008259 A1* | 1/2010 | Yoon | H04W 48/20 | 370/254 |
| 2010/0074193 A1* | 3/2010 | Chaponniere | H04L 1/0026 | 370/329 |
| 2010/0279701 A1* | 11/2010 | Chen | H04L 1/0002 | 455/452.2 |
| 2011/0013717 A1* | 1/2011 | Josiam | H04W 72/0413 | 375/295 |
| 2011/0098074 A1* | 4/2011 | Seo | H04L 5/0007 | 455/509 |
| 2011/0188391 A1* | 8/2011 | Sella | H04W 24/10 | 370/252 |
| 2011/0216713 A1* | 9/2011 | Kim | H04L 5/0053 | 370/329 |
| 2011/0222399 A1* | 9/2011 | Shi | H04W 28/18 | 370/230 |
| 2012/0106452 A1* | 5/2012 | Kneckt | H04W 48/08 | 370/328 |
| 2012/0127934 A1* | 5/2012 | Anderson | H04W 72/0406 | 370/329 |
| 2012/0184242 A1 | 7/2012 | Li et al. | | |
| 2012/0314590 A1* | 12/2012 | Choudhury | H04B 7/0452 | 370/252 |
| 2012/0329429 A1 | 12/2012 | Jabara et al. | | |
| 2013/0107783 A1* | 5/2013 | Shaw | H04W 4/06 | 370/312 |
| 2013/0107861 A1* | 5/2013 | Cheng | H04W 72/042 | 370/331 |
| 2013/0167196 A1 | 6/2013 | Spencer et al. | | |
| 2013/0208701 A1* | 8/2013 | Cho | H04W 88/04 | 370/331 |
| 2013/0250925 A1* | 9/2013 | Lohr | H04W 72/0446 | 370/336 |
| 2013/0318233 A1 | 11/2013 | Biswas et al. | | |
| 2014/0029586 A1* | 1/2014 | Loehr | H04W 56/0005 | 370/336 |
| 2014/0079016 A1* | 3/2014 | Dai | H04L 5/0041 | 370/330 |
| 2014/0187230 A1 | 7/2014 | Pallotta | | |
| 2014/0219262 A1 | 8/2014 | Sun et al. | | |
| 2014/0376378 A1 | 12/2014 | Rubin et al. | | |
| 2015/0156708 A1* | 6/2015 | Tietz | H04W 4/02 | 455/434 |
| 2015/0207698 A1* | 7/2015 | Raleigh | G06Q 30/0601 | 709/225 |
| 2015/0304291 A1* | 10/2015 | Cook | H04W 12/12 | 713/159 |
| 2015/0358423 A1* | 12/2015 | L'Heureux | G06F 17/30 | 705/21 |
| 2016/0014679 A1* | 1/2016 | Taneja | H04W 4/70 | 455/434 |
| 2016/0112921 A1* | 4/2016 | Nagasaka | H04W 36/22 | 370/331 |
| 2016/0135016 A1* | 5/2016 | Zou | H04W 4/06 | 370/312 |
| 2016/0219462 A1* | 7/2016 | Anderson | H04W 28/20 | |

OTHER PUBLICATIONS

US 8,655,339, 02/2014, Raleigh (withdrawn)
US 8,666,365, 03/2014, Raleigh (withdrawn)
"Cox WiFi Hotspots" Cox Communications. Published online at [http://www.cox.com/residential/internet/wifihotspots.cox?campcode=gntile_wifi_learn_042413]. Retrieved on Jan. 11, 2015, 2 pages.
Zuckerman, "Decentralizing the mobile phone: A second ICT4D revolution?." Information Technologies & International Development, vol. 6, SE (2010) published online at [http://www.itidjournal.org/index.php/itid/article/download/631/271]. Retrieved on Jan. 14, 2015, 6 pages.
McKnight, et al. ,"Wireless Grids—Distributed Resource Sharing by Mobile, Nomadic, and Fixed Devices." Internet Computing, IEEE 8.4 (Jul.-Aug. 2004). Published online at [http://sobco.com/papers/internet.computing.2004.pdf]. Retrieved on Jan. 14, 2015, 8 pages.
Seth, et al. "Low-cost communication for rural internet kiosks using mechanical backhaul." Proceedings of the 12th annual international conference on Mobile computing and networking. ACM, Sep. 2006. Published online at [http://blizzard.cs.uwaterloo.ca/keshav/home/Papers/data/06/mobicom06.pdf]. Retrieved on Jan. 14, 2015, 12 pages.
Gervais et al. "Cloud Control: Copyright, Global Memes and Privacy." J. on Telecomm. & High Tech. vol. 10 (2012). Published online at [http://www.jthtl.org/content/articles/V10I1/JTHTLv10i1_Gervais.PDF]. Retrieved on Jan. 14, 2015, 40 pages.
Sharma, et al. "Cool-Tether: energy efficient on-the-fly wifi hotspots using mobile phones." Proceedings of the 5th international conference on Emerging networking experiments and technologies. ACM, Dec. 2009. Published online at [http://research.microsoft.com/pubs/103175/conext10.pdf]. Retrieved on Jan. 14, 2015, 12 pages.

* cited by examiner

RESOURCE-SENSITIVE TOKEN-BASED ACCESS POINT SELECTION

TECHNICAL FIELD

The disclosed subject matter relates to wireless network communication, including resource-sensitive token-based access point selection via a wireless network.

BACKGROUND

By way of brief background, conventional access point selection generally employs access points (APs) that are visible to, and broadcast identification information to, mobile devices. As an example, a Wi-Fi access point (AP) can broadcast a service set identifier (SSID). This SSID can be received by a mobile device or a user equipment, hereinafter 'UE' or similar term, to identify a proximate AP. Identification of the AP can enable the UE to link with the AP to allow communication of information across an air interface. As APs become more ubiquitous, the number of APs available to a UE can increase dramatically and can decrease the efficiency of AP selection by the UE. More particularly, knowledge of available resources via different APs can lead to less efficient allocation of resources.

DETAILED DESCRIPTION

Figure 1:
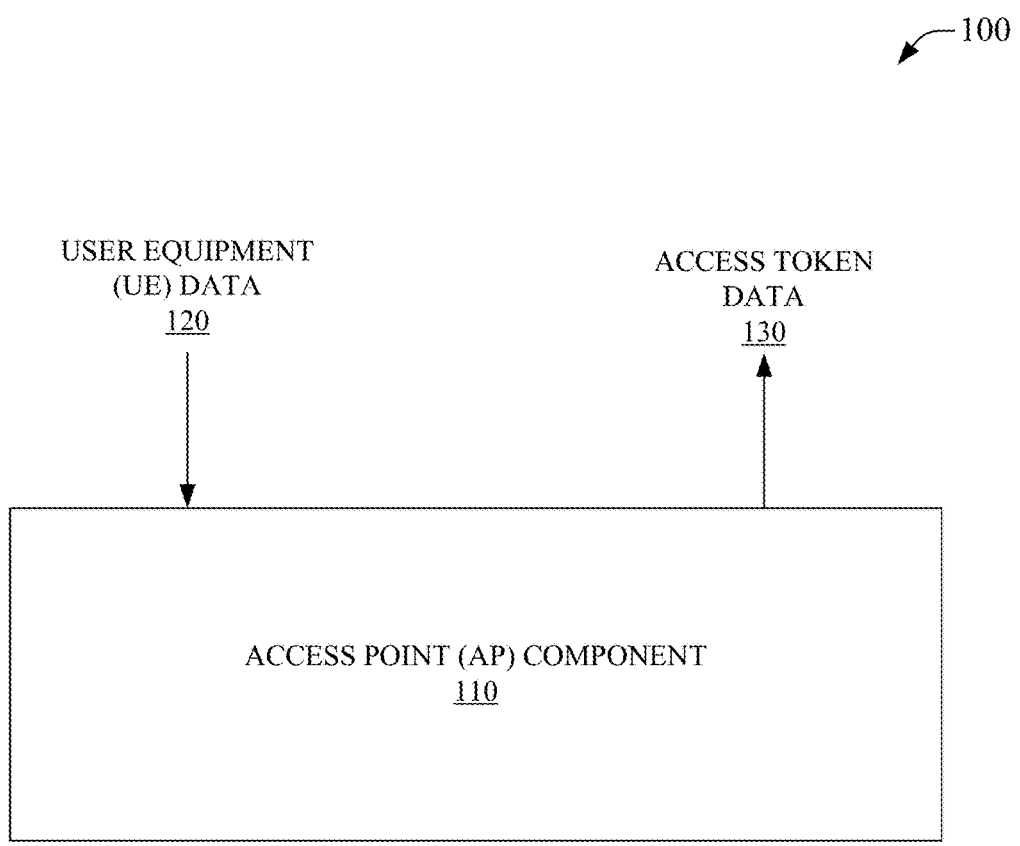
FIG. 1 is an illustration of an example system that facilitates resource-sensitive access point selection in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional access point (AP) selection generally employs access points (APs) that are visible to, and broadcast identification information to, mobile devices. As an example, a femtocell AP can broadcast an identifier that can be received by a mobile device or a UE to aid in identifying the femtocell AP as within range of the UE. Identification of the AP can enable the UE to link with the AP to allow communication of information across an air interface, e.g., via cellular, Wi-Fi, near field communication (NFC), infrared (IR), Bluetooth, ZigBee, etc. As APs become more ubiquitous, the number of APs available in range of a UE can increase which can decrease the efficiency of AP selection at the UE. Further, lack of knowledge related to available AP resources can lead to less efficient allocation of resources via UE selection of APs with less ideal matches between an available resource characteristic and a UE designated resource characteristic. In a further aspect, APs with small coverage footprints can result in frequent handovers to other APs for a UE that changes location in time as compared to selection of larger footprint APs for moving devices to lower handoffs, etc.

The instant disclosure seeks to reduce the effects of conventional AP selection technologies. In an aspect, APs can be adapted to receive UE identifier (UEID) information to enable selection of an AP. Of note, this can be in addition to, or in place of, the AP making AP identifier (APID) information, e.g., SSID, etc., available to a UE. As an example, an AP can be 'invisible' by not broadcasting an APID and, rather, receiving UEIDs for UEs proximate to the AP. As another example, an AP can both broadcast an APID and also receive UEIDs. Generally, the balance of the instant disclosure will focus on invisible APs for clarity and brevity, but all embodiments of APs that are not invisible are also to be considered within the scope if the present disclosure. In an aspect, UE data can include UEID information, historical UE information, UE location information (e.g., location, proximity, etc.), UE requested resource information (e.g., current resource characteristic, minimum resource characteristic, ideal resource characteristic, anticipated resource characteristic, historical resource characteristic, etc.), UE state information (e.g., charging, idle, active, background apps running, etc.), UE provider information, UE subscription plan information, UE environmental information, or nearly any other type of UE related information. In another aspect, AP data can include APID information, historical AP information, AP location information, AP available resource information (e.g., currently available, anticipated available, historically available, whitelists, blacklists, etc.), AP state information, AP carrier information, AP environmental information, or nearly any other type of AP related information. Moreover, an AP can include devices or components enabling a communicative link between an AP and a UE, e.g., a Wi-Fi AP, femto/pico/microcell, NodeB, eNodeB, Bluetooth AP, point of sale (POS) component including IR, NFC, or other types of POS AP, etc. In an embodiment, NFC can use electromagnetic induction between two antennas located within each other's near field, effectively forming an air-core transformer. Further, NFC can involve an initiator component and a target component wherein the initiator component can generates a radio frequency field that can induce power in the, typically passive, target component, often referred to as a "NFC tag" This can enable NFC target components to take very simple form factors such as tags, stickers, key fobs, cards, etc., often as passive or unpowered devices. A UE can correspondingly be a mobile device, smartphone, tablet computer, wearable computing device, smart credit/debit card component, laptop, vehicular computing device, etc.

Where an AP receives UEIDs for proximate UEs, an AP, in an embodiment of the instant disclosure, can then select which UEs to link to the AP. Moreover, in an aspect, the AP can determine what resources to make available to the UEs selected for linking. Where the AP is invisible, this can shift aspects of AP selection from a UE to an AP. Where the AP selects a UE for linking, deficiencies of conventional AP selection technologies can be mitigated. As an example, selection of a UE by an AP can be processed by non-UE components, e.g., AP components, etc., which can improve UE battery consumption, etc., As a further example, selection of a UE by an AP can be cognizant of AP resources allowing allocation of those resources in a more controlled manner. In another example, UE data can be considered to allow selection of a UE by an AP in a manner that comports with the usage of the UE, e.g., selection of a UE by larger footprint APs in environments where the UE is more mobile, selection of a UE by smaller footprint APs in environments where the UE is less mobile, selection of a UE by an AP based on the historical use of the UE, etc.

To this end, some embodiments of the disclosed subject matter can include generating access token data (ATD) that can enable selection of a UE-AP pair with regard to forming a communicative link between the UE and the AP. The ATD can be generated in response to receiving UE data. As an example, where UE data includes requested resource minimum characteristics and ideal characteristics, the ATD can comprise information indicating a AP for the UE to link to that is selected based on current and anticipated available resources at the AP and their fit to the minimum characteristics and ideal characteristics of the UE requested resource. This example illustrates that resource usage efficiency can be affected by allowing selection of UE-AP pairs that consider resource needs and available resources for a given UE set and a given AP set. In an aspect, the ATD can be received by the UE, particularly where an AP is invisible, via nearly any modality, e.g., via Wi-Fi, Bluetooth, cellular, LTE, IR, NFC, etc. The ATD can then be employed by the UE to initiate a link with an AP indicated in the ATD. As such, for example, a UE can broadcast UE data that can be received by an AP to enable generation of ATD which can be received by the UE to enable initiation of a link with an AP indicated in the ATD. In some instances, no AP can be indicated, e.g., in instances where there UE resource requirements cannot be met by an available AP, etc., in which case no ATD may be generated, an ATD indicating no appropriate APs are available can be generated, etc.

In an embodiment, an AP can generate ATD. Where an AP receives UE data for one or more UEs in range of the AP, the AP can select which UEs to link with and can generate ATD reflecting this selection. In an aspect, selection can consider requested resources, available resources, carriers, UE preference data, black/white listed UEIDs, etc. As such, even though the AP can be invisible to UEs proximate to the AP, the AP can receive and employ UE data to select UE-AP pairs. This selection can be reflected in ATD. ATD can be received by the UE to enable linking with a designated AP. Where the AP is invisible, linking can occur without the UE 'seeing' the AP, e.g., via an open broadcast of an SSID, etc. In an aspect, ATD can be received by the UE via nearly any modality, for example, ATD can be received by the UE via a cellular transmission to enable linking with a Wi-Fi AP. Of note, in some embodiments, ATD can be included in background transmissions to a UE, e.g., communications not specifically initiated to communicate ATD, for example, when a UE experiences a handover between cellular sectors, updated ATD can be transmitted to the UE as part of other communications to the UE associated with the cellular handover, etc. In other embodiments, ATD can be part of a ATD-message to the UE, e.g., the ATD can be comprised in communications to the UE specifically associated with communicating ATD.

In an embodiment, a system can comprise a process or memory allowing execution of stored instructions to enable the processor to receive a request for resource allocation associated with a user equipment. The request for resource allocation can be received from the user equipment independent of the user equipment having received information about an access point device in advance of the request for resource allocation having been received, e.g., the access point can effectively be treated as invisible to the user equipment. The processor can further determine a fitness metric value related to provisioning a resource via the access point device, and provision the resource for utilization by the user equipment via the access point device, based on the fitness metric value. Moreover, the processor can enable access by the user equipment to the resource via the access point device in response to the provisioning of the resource.

In another embodiment, a method can comprise receiving, by a system comprising a processor, user equipment data associated with a user equipment. The user equipment data can further comprise an indication of a requested wireless communication resource. The user equipment data can be received from the user equipment independent of the user equipment having received access point data related to an access point device. The method can further comprise determining pair information, by the system and based on the user equipment data and the access point data, that can be related to pairing of the user equipment and an access point resource. Moreover, the method can comprise the system generating access token data associated with an access token based on the user equipment data, the access point data, and the pair information. The access token data can enable the user equipment to initiate a wireless link to the access point device to employ the access point resource.

In a further embodiment, a computer readable medium can comprise instructions that can cause a system comprising a processor to receive an indication of wireless communication resource needs associated with a user equipment. The indication can be received from the user equipment independent of the user equipment receiving access point data related to an access point device. The instructions can also cause the processor to determine pair information related to pairing of the user equipment and an access point device to enable the user equipment to employ a resource of the access point device, based on the indication and the access point data. Moreover, the instructions can cause the processor to generate resource data associated with enabling the user equipment to initiate a wireless link to the access point device to employ the access point resource and allow access to the resource data by the UE.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates resource-sensitive access point selection in accordance with aspects of the subject disclosure. System 100 can include access point (AP) component 110. In some embodiments, AP component 110 can be invisible, e.g., AP component 110 can receive UE identifier (UEID) information from a UE rather than transmit AP identifier (APID) information to a UE. In other embodiments, AP component 110 can both receive UEID information from a UE and transmit APID information to a UE. UE data 120 can comprise UEID information.

In an aspect, AP component 110 can be comprised in an AP device, e.g., a Wi-Fi AP device, a POS device, a femto-, a pico-, or a nano-cell device, a Bluetooth AP device, etc. The AP device can generally facilitate wireless devices, e.g., UEs, etc., to connect to a wired network or other wireless network. An AP can connect to a router as a standalone device, but it can also be an integral component of the router or other device itself. Of note, an AP is expressly not restricted to Wi-Fi or IEEE 802.xx-type standards and can encompass other wireless standards, both electromagnetic and non-electromagnetic, such as Bluetooth, Zigbee, IR, etc. As such, an AP, as employed in this disclosure, can be a Wi-Fi access point, a POS device employing NFC technology, a Bluetooth AP, etc. As an example, a Wi-Fi AP device can comprise AP component 110 that can receive UE data 120 comprising UEID information, can select to link with the UE based on UE data 120, and can generate access token data (ATD) 130 to facilitate the UE initiating a link to the Wi-Fi AP device. ATD data can be received by a UE via communications from the Wi-Fi AP device, e.g., via Wi-Fi or other communication modality embodied in the Wi-Fi AP device, or can received by the UE via another component (not illustrated), such as through a cellular communication via a NodeB, wherein ATD 130 can be communicated to the NodeB by a backend network that is not illustrated for clarity and brevity.

AP component 110 can receive UE data 120. UE data 120 can include UEID information, historical UE information, UE location information (e.g., location, proximity, etc.), UE requested resource information (e.g., current resource characteristic, minimum resource characteristic, ideal resource characteristic, anticipated resource characteristic, historical resource characteristic, etc.), UE state information (e.g., charging, idle, active, background apps running, etc.), UE provider information, UE subscription plan information, UE environmental information, or nearly any other type of UE related information. In an aspect, UE data 120 can function to bring into AP component 110 data relevant to selecting a UE-AP pair. Selection of a UE-AP pair can be related to seeking to pair a UE and an AP in a manner that reduced waste of resources. As an example, where UE data 120 comprises information indicating that resources for communicating transactional data, which is relatively compact and brief in comparison to streaming data or the like, is desired, an AP can be selected to be paired to the UE where the AP has an available resource that will facilitate the communication of the transactional data but cannot select an AP that does not have adequate resources or that has a resource that would be better employed by another UE that can request a high bandwidth resource. As such, selection can facilitate improved allocation of resources available via an AP for UE use in consideration of requested provisioning of a resource by the UE. In a scenario where the AP is invisible, this can allow AP component 110 to drive AP selection via ATD 130 as initiated by the UE.

In some embodiments, UE data 120 can comprise information for multiple UEs, such that selection of UE-AP pairs via AP component 110 results in allocation of resources to the several UEs in a manner that reduces waste of the resources. As an example, a low bandwidth connection with a first UE can be indicated in ATD 130, such as a connection on a crowded frequency of an AP device, where the first UE needs minimal bandwidth, while a second UE can be allocated a connection via ATD 130 for a relatively uncrowded frequency channel of the AP device where the second UE requests a high bandwidth channel, e.g., for streaming video, etc.

In other embodiments, AP comp 110 can select a UE-AP pairing from among a plurality of AP devices via ATD 130. AP component 110 can receive information related to resources available for a plurality of AP devices, not illustrated in FIG. 1 for clarity and brevity. AP component 110 can then select which resource on which AP device to select for a given UE requested resource, e.g., information contained in UE data 120. As such, rather than simply selecting an AP with the strongest signal as might be done in a conventional technique, the instant disclosure can allow for selection of an AP based on matching an available resource with a requested resource, e.g., an AP that would otherwise have a lower signal strength can be selected for pairing, via ATD 130, where the resource need and availability are a better match than for an AP that would otherwise have a stronger signal strength. Of note, other considerations can also be considered, for example, where there is little congestion of the wireless networks for several APs and associated UEs, more bandwidth, higher signal strength, etc., can be selected for a UE-AP pairing. As an example, a high bandwidth AP resource can be paired to a UE with a low bandwidth request, even where this results in some waste, because it can provide an improved customer experience and there are not other demands for the same resource.

ATD 130 can comprise information enabling a UE to initiate a communicative link with a selected AP. The communicative link with the AP can be directed to a designated resource of the AP. The communicative link with the AP can be responsive to requested resource characteristics that can be indicated via UE data 120 to AP component 110. In an aspect, ATD 130 can enable resource-sensitive selection of a UE-AP pair with regard to forming a communicative link between the UE and the AP. ATD 130 can be generated by AP component 110. In some embodiments, ATD 130 can be received by a UE via AP component 110. In other embodiments, ATD 130 can be received by a UE via another component, for example, ATD 130 can be communicated to a UE from AP component 110 via a carrier backbone network, through a carrier-side component, over the internet to a $3^{rd}$ party component, to femtocell, then to the UE through a Bluetooth connection to the UE.

In an aspect, ATD 130 can comprise UE data 120, in whole or in part. In some embodiments, ATD 130 can comprise UEID information. Further, ATD 130 can comprise AP data, in whole or in part. Moreover, ATD 130 can comprise information related to a selected UE-AP pairing. In some embodiments, ATD 130 can comprise information related to a plurality of UE-AP pairings, which can comprise parings for a UE with different APs, parings for a UE with different resources of an AP, parings for a plurality of UEs with different APs, parings for a plurality of UEs with different resources of an AP, no paring for a UE with an AP or AP resource, etc. As such, ATD 130 can be generated by AP component 110 to function with one UE and one AP device, for multiple UEs and one AP device, for one UE and multiple AP devices, etc., wherein the AP device(s) can have one or more resources, the UE(s) can be associated with one or more requested resource, and wherein a rule related to selecting an AP resource in response to a UE requested resource has been satisfied.

Figure 2:
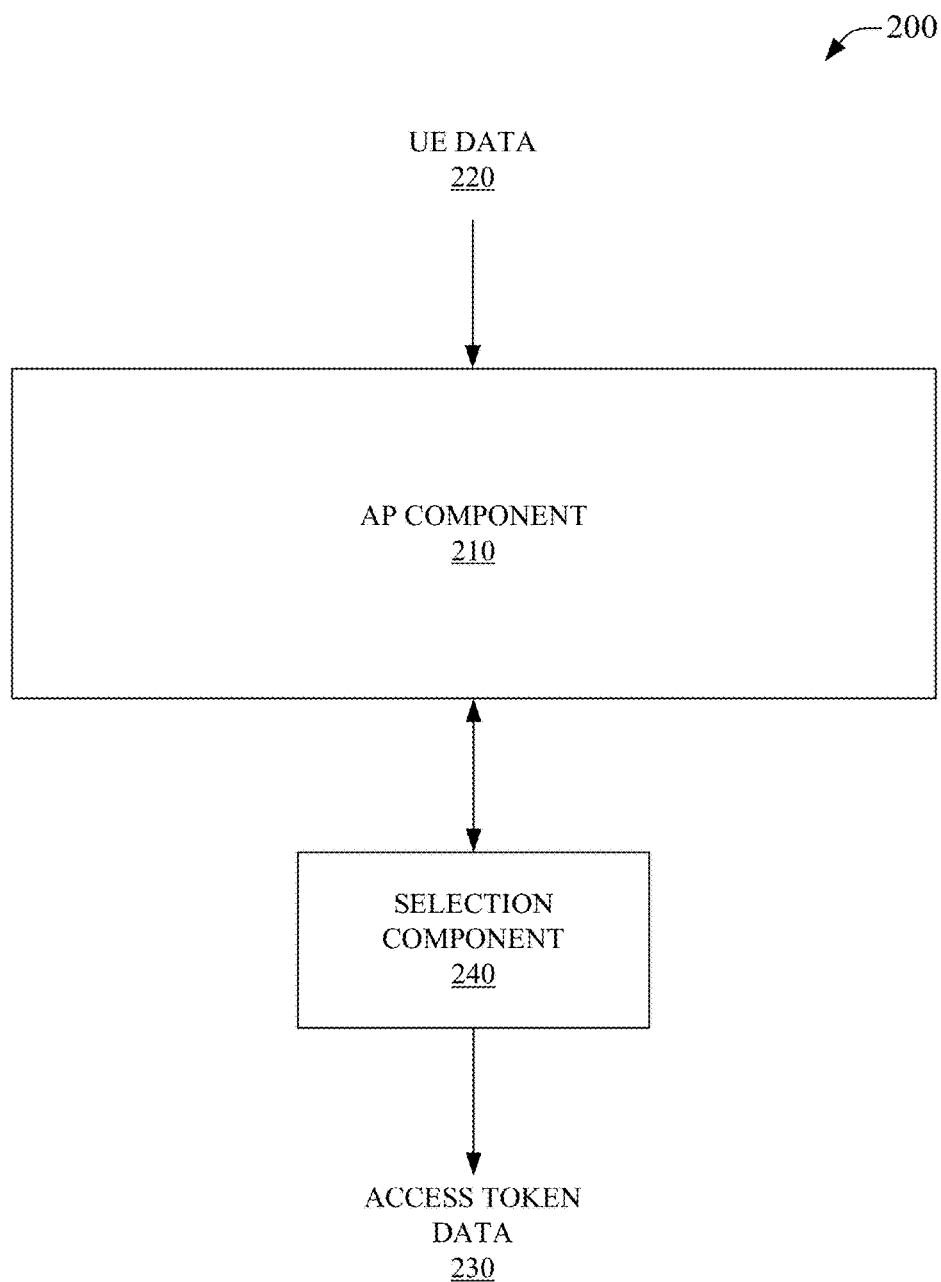
FIG. 2 is a depiction of an example system that facilitates resource-sensitive access point selection based on UE data received via an AP component in accordance with aspects of the subject disclosure.

FIG. 2 is a depiction of a system 200 that can facilitate resource-sensitive access point selection based on UE data 220 received via AP component 210 in accordance with aspects of the subject disclosure. System 200 can include AP component 210. In some embodiments, AP component 210 can be invisible, e.g., AP component 210 can receive UEID information from a UE (not illustrated) rather than transmit APID information to the UE. In other embodiments, AP component 210 can both receive UEID information from a UE and transmit APID information to a UE. UE data 220 can comprise UEID information. In an aspect, AP component 210 can be comprised in an AP device. The AP device can generally facilitate wireless device connections to a wired network or other wireless network.

AP component 210 can receive UE data 220. UE data 220 can include UEID information, historical UE information, UE location information, UE requested resource information, UE state information, UE provider information, UE subscription plan information, UE environmental information, or nearly any other type of UE related information. In an aspect, UE data 220 can comprise data relevant to selecting a UE-AP pair. Selection of a UE-AP pair can be related to pairing a UE and an AP in a manner that reduces resource waste. As an example, where UE data 220 comprises information indicating that resources for communicating data should be highly secure, such as for communicating banking data, an AP can be selected to be paired to the UE where the AP has an available resource that will facilitate highly secure communication of transactional information over selecting an AP resource that is of lower security. As such, selection can facilitate improved allocation of resources available via an AP for UE use in consideration of requested provisioning of a resource by the UE. In this example, provisioning of the highly secure resource for a UE requesting a highly secure resource illustrates less waste than pairing another UE not requesting a highly secure resource, where there the highly secure resource is a limited resource. Of note, where all resources of the example AP are highly secure, this selection criteria can be considered moot, and selection can be based on other characteristics of the available resources and requested resources. In some embodiments, UE data 220 can comprise information for multiple UEs, such that selection of UE-AP pairs results in allocation of resources to the several UEs in a manner that reduces waste of the resources.

System 200 can comprise selection component 240 that can be communicatively coupled to AP component 210. Selection comp 240 can select a UE-AP pairing from among a plurality of AP devices and can generate ATD 230 comprising this pairing information. Selection component 240 can receive information related to resources available for a plurality of AP devices, not illustrated in FIG. 2 for clarity and brevity, wherein an AP device of the plurality comprises AP component 210. Selection component 240 can then select which resource on which AP device to select for a given UE requested resource, e.g., information contained in UE data 220 and received at selection component 240 via AP component 210. As such, the instant disclosure can allow for selection of an AP resource based on a rule related to selection of an available resource in view of information related to a requested resource.

In some embodiments, selection component 240 can be located remotely from AP component 210. As an example, AP component 210 can be located at an edge device for a radio access network (RAN) while selection component 240 can be located in a carrier-core component and be communicatively coupled to AP component 210 via one or more wired and/or wireless links. This aspect of the disclosed subject matter can allow centralization of selection component 240. In some embodiments, selection component 240 can serve a plurality of AP components. This plurality of AP components can, in an aspect, be viewed as 'remote radio heads' or 'thin AP components', e.g., where AP component 210 embodies Layer 1 functionality and Layer 2-7 can be embodied and/or virtualized at selection component 240. In an embodiment, therefore, selection component 240 can act as Layer 2-7 for a plurality of 'remote radio heads' each comprising an AP component 210 that embodies Layer 1 functionality. Selection component 240 can generate ATD 230 for any number of UE-AP pair selections based on UE data 220.

In other embodiments, selection component 240 can be located local to AP component 210. As an example, selection component 240 can be located in a central office in a mall and can interact with AP components located with AP devices in various shops comprising the mall. Selection component 240 and the several AP components can be communicatively coupled via a wired and/or wireless local area network associated with the mall. In some embodiments, selection component 240 can be co-located with AP component 210, for example, where selection component is co-located in an AP device with AP component 210. In some of these embodiments, selection component 240 can also be communicatively coupled with other AP components located locally or remotely, e.g., where a first AP device comprises AP component 210 and selection component 240, selection component 240 can further be coupled to anther AP component 210 located somewhere else in the mall and/or can be further coupled to another AP component 210 located in another city/country/etc.

ATD 230 can comprise information enabling a UE to initiate a communicate link between an AP and the UE, wherein the AP is selected via selection component 240. The communicative link between the UE and the AP can comprise a designated resource of the AP. The communicative link with the AP can be responsive to requested resource characteristics that can be comprised in UE data 220 and can be passed to selection component 240 via AP component 210. In an aspect, ATD 230 can enable resource-sensitive selection of a UE-AP resource pair with regard to forming a communicative link between the UE and the AP. ATD 230 can be generated by selection component 240. In some embodiments, ATD 230 generated by selection component 240 can be received by a UE, not illustrated, via AP component 210, e.g., selection component 240 can generate ATD 230 and send it back through AP component 210 to a UE. In other embodiments, ATD 230 can be received by a UE via another component, for example, ATD 230 can be communicated to a UE from selection component 240 via an internet component, a carrier-side component, etc.

In an aspect, ATD 230 can comprise UE data 220, in whole or in part. In some embodiments, ATD 230 can comprise UEID information. Further, ATD 230 can comprise AP data, in whole or in part. Moreover, ATD 230 can comprise information related to a selected UE-AP resource pairing. In some embodiments, ATD 230 can comprise information related to a plurality of UE-AP resource pairings, which can comprise resource parings for a UE with different APs, parings for a UE with different resources of an AP, parings for a plurality of UEs with different APs, parings for a plurality of UEs with a different resources of an AP, no paring for a UE with an AP or AP resource, etc. As such, ATD 230 can be generated for one UE and one AP device, for multiple UEs and one AP device, for one UE and multiple AP devices, etc., wherein the AP device(s) can have one or more resources, the UE(s) can be associated with one or more requested resource, and wherein a rule related to selecting an AP resource in response to a UE requested resource has been satisfied.

Figure 3:
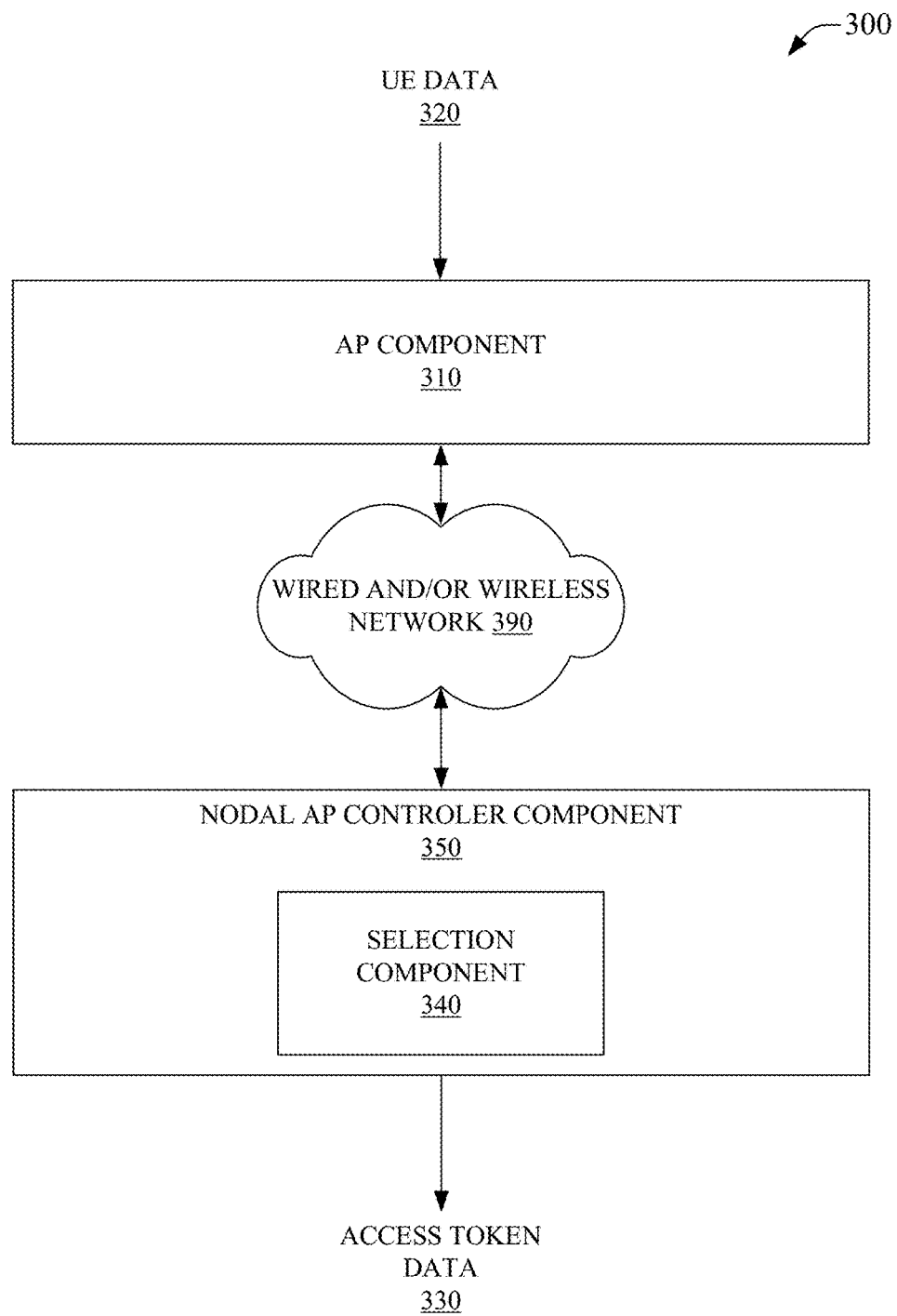
FIG. 3 illustrates an example system that facilitates resource-sensitive access point selection employing a nodal AP controller component in accordance with aspects of the subject disclosure.

FIG. 3 illustrates a system 300 that facilitates resource-sensitive access point selection employing nodal AP controller component 350 in accordance with aspects of the subject disclosure. System 300 can include AP component 310. In some embodiments, AP component 310 can be invisible, e.g., AP component 310 can receive UE data 320 from a UE (not illustrated) rather than transmit AP data (not illustrated) to the UE. In other embodiments, AP component 310 can both receive UE data 320 from a UE and transmit AP data to a UE. In an aspect, AP component 310 can be comprised in an AP device. The AP device can generally facilitate wireless device connections for a UE to a wired network or other wireless network.

AP component 310 can receive UE data 320. UE data 320 can include UEID information, historical UE information, UE location information, UE requested resource information, UE state information, UE provider information, UE subscription plan information, UE environmental information, or nearly any other type of UE related information. In an aspect, UE data 320 can comprise data relevant to selecting a UE-AP resource pair. Selection of a UE-AP resource pair can be related to pairing a UE and an AP resource in a manner that reduces waste of the AP resource. As an example, where UE data 320 comprises information indicating that resources for communicating data should employ only resources having servers in a particular country, an AP resource can be selected to be paired to the UE where the AP has an available resource that only employs servers in the indicated country. As such, selection can facilitate improved allocation of resources available via an AP for UE use in consideration of requested provisioning of a resource by the UE. Of note, resource selection can be based on other characteristics of the available resources and requested resources. In some embodiments, UE data 320 can comprise information for multiple UEs, such that selection of UE-AP resource pairs results in allocation of resources to the several UEs in a manner that reduces waste of the aggregate resources, e.g., by applying a rule related to the aggregate resources than by rules to individual resources. This can allow for selections that can be wasteful of individual resources while it reduces waste of the aggregate resources.

System 300 can comprise selection component 340 that can be communicatively coupled to AP component 310 via nodal AP comptroller component 350 and wired and/or wireless network 390, hereinafter 'network 390'. Selection comp 340 can select a UE-AP pairing from among a plurality of AP devices coupled to nodal AP controller component 350 via network 390, although for the sake of clarity and brevity, only AP component 310 is illustrated as coupled to nodal AP controller component 350 via network 390. Nodal AP controller component 350 can generate ATD 330 comprising pairing information. Selection component 340 can receive information related to resources available for a plurality of AP devices, wherein an AP device of the plurality comprises AP component 310. Selection component 340 can then select which resource on which AP device to select for a given UE requested resource, e.g., information contained in UE data 320 and received at selection component 340. As such, the instant disclosure can allow for selection of an AP resource based on a rule related to selection of an available resource in view of information related to a requested resource.

In some embodiments, nodal AP controller component 350 can be located remotely from AP component 310. As an example, AP component 310 can be located in a first country while nodal AP controller component 350 can be located in a second country and be communicatively coupled to AP component 310 via network 390 This aspect of the disclosed subject matter can allow centralization of nodal AP controller component 350. In some embodiments, nodal AP controller component 350 can serve a plurality of AP components. This plurality of AP components can, in an aspect, be viewed as 'remote radio heads' or 'thin AP components', e.g., where AP component 310 embodies Layer 1 functionality and Layer 2-7 can be embodied and/or virtualized at nodal AP controller component 350, while selection functions are performed by selection component 340. In an embodiment, therefore, nodal AP controller component 350 can act as Layer 2-7 for a plurality of 'remote radio heads' each comprising an AP component 310 that embodies Layer 1 functionality. Nodal AP controller component 350 can, via selection component 340, generate ATD 330 for any number of UE-AP pair selections based on information comprised in UE data 320.

In other embodiments, nodal AP controller component 350 can be located local to AP component 310. As an example, nodal AP controller component 350 can be located onsite at a retailer and can interact with AP components located with POS devices at the various checkout stations of the retailer site. Nodal AP controller component 350 and the several AP components can be communicatively coupled via a local area network associated with the retail site, e.g., network 390. In some embodiments, nodal AP controller component 350 can be co-located with an AP component 310, for example, where selection component is co-located in a POS device with AP component 310. In some of these embodiments, nodal AP controller component 350 can also be communicatively coupled with other AP components located locally or remotely, e.g., where a first POS device comprises AP component 310 and nodal AP controller component 350, nodal AP controller component 350 can further be coupled to another AP component 310 located somewhere else on the retail site and/or can be further coupled to another AP component 310 located at another retail site.

ATD 330 can comprise information enabling a UE to initiate a communicative link between an AP resource and the UE, wherein the AP resource is selected via selection component 340. The communicative link between the UE and the AP can comprise a designated resource of the AP. The communicative link with the AP can be responsive to requested resource characteristics that can be comprised in UE data 320, which characteristics can be communicated to selection component 340. In an aspect, ATD 330 can enable resource-sensitive selection of a UE-AP resource pair with regard to forming a communicative link between the UE and the AP device. ATD 330 can be generated by nodal AP controller component 350, via selection component 340. In some embodiments, ATD 330 generated by nodal AP controller component 350 can be received by a UE, not illustrated, via AP component 310, e.g., nodal AP controller component 350 can generate ATD 330 and send it back through AP component 310 to a UE. In other embodiments, ATD 330 can be received by a UE via another component, for example, ATD 330 can be communicated to a UE from nodal AP controller component 350 via an internet component, a carrier-side component, etc.

In an aspect, ATD 330 can comprise UE data 320, in whole or in part. In some embodiments, ATD 330 can comprise UEID information. Further, ATD 330 can comprise AP data, in whole or in part. Moreover, ATD 330 can comprise information related to a selected UE-AP resource pairing. In some embodiments, ATD 330 can comprise information related to a plurality of UE-AP resource pairings, which can comprise resource parings for a UE with different APs, parings for a UE with different resources of an AP, parings for a plurality of UEs with different APs, parings for a plurality of UEs with a different resources of an AP, no paring for a UE with an AP or AP resource, etc. As such, ATD 330 can be generated for one UE and one AP device, for multiple UEs and one AP device, for one UE and multiple AP devices, etc., wherein the AP device(s) can have one or more resources, the UE(s) can be associated with one or more requested resource, and wherein a rule related to selecting an AP resource in response to a UE requested resource has been satisfied.

Figure 4:
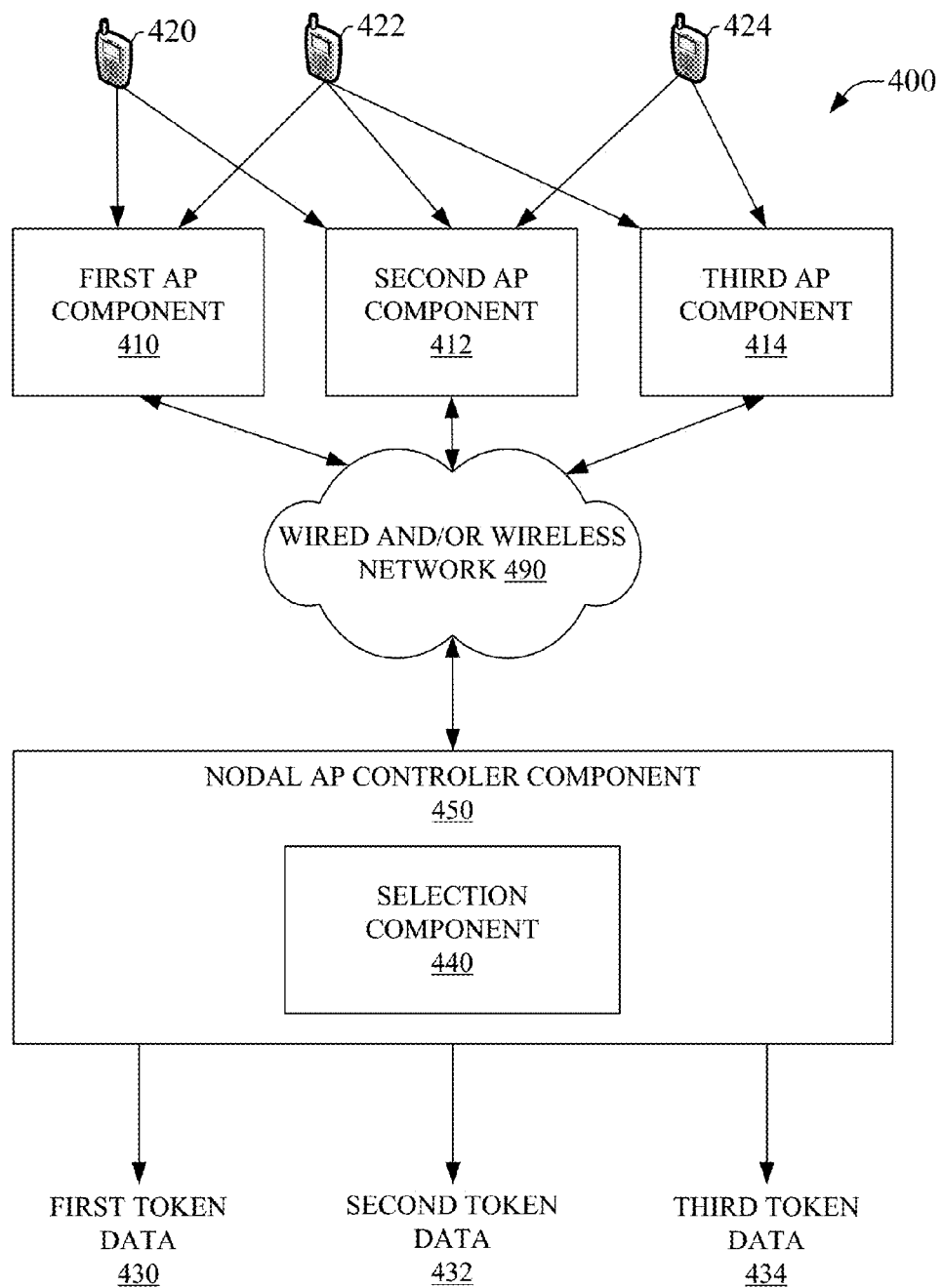
FIG. 4 illustrates an example system that facilitates resource-sensitive access point selection for a plurality of AP components in accordance with aspects of the subject disclosure.

FIG. 4 illustrates a system 400 that facilitates resource-sensitive access point selection for a plurality of AP components, 410-414, in accordance with aspects of the subject disclosure. System 400 can include AP component 410, AP component 412, and AP component 414. In some embodiments, one or more of AP component(s) 410-414 can be invisible, e.g., AP component(s) 410-414 can receive UE data from UE(s) 420-424 rather than transmit AP data (not illustrated) to UE(s) 420-424. In other embodiments, AP component(s) 410-414 can both receive UE data from UE(s) 420-424 and transmit AP data to UE(s) 420-424. In an aspect, AP component(s) 410-414 can be comprised in AP device(s), not illustrated. The AP device(s) can generally facilitate wireless device connections for UE(s) 420-424 to a wired network or other wireless network, e.g., network 490.

AP component(s) 410-414 can receive UE data from UE(s) 420-424. UE data can include UEID information, historical UE information, UE location information, UE requested resource information, UE state information, UE provider information, UE subscription plan information, UE environmental information, or nearly any other type of UE related information. In an aspect, UE data can comprise data relevant to selecting a UE-AP resource pair. Selection of a UE-AP resource pair can be related to pairing a UE and an AP resource in a manner that reduces waste of the AP resource. As an example, where UE data comprises information indicating that resources for communicating data should employ only resources of a set of carriers, an AP resource can be selected to be paired to the UE where the AP has an available resource that is of the set of carriers. As such, selection can facilitate improved allocation of resources available via an AP for UE use in consideration of requested provisioning of a resource by UE(s) 420-424. Of note, resource selection can be based on other characteristics of the available resources and requested resources. In some embodiments, UE data can comprise information for multiple UEs, e.g., UE(s) 420-424, such that selection of UE-AP resource pairs results in allocation of resources to the several UEs in a manner that reduces waste of the resources.

System 400 can comprise selection component 440 that can be communicatively coupled to AP component(s) 410-414 via nodal AP comptroller component 450 and wired and/or wireless network 490. Selection comp 440 can select a UE-AP pairing from among a plurality of AP devices coupled to nodal AP controller component 450 via network 490, e.g., AP devices comprising AP component(s) 410-414 as illustrated. Nodal AP controller component 450 can generate ATD comprising pairing information, e.g., first toke data 430 (hereinafter token 430), second token data 432 (hereinafter token 432), and/or third token data 434 (hereinafter token 434). Selection component 440 can receive information related to resources available for a plurality of AP devices, correspondingly comprising AP component(s) 410-414. Selection component 440 can then select which resource on which AP device to select for a given UE requested resource, e.g., information contained in UE data from UE(s) 420-424 and received at selection component 440. As such, the instant disclosure can allow for selection of an AP resource based on a rule related to selection of an available resource in view of information related to a requested resource.

System 400 illustrates that first AP component 410 (hereinafter AP 410) and second AP component 412 (hereinafter AP 412) can receive UE data from UE 420. Further illustrated, AP 410, AP 412, and third AP component (hereinafter AP 414) can receive UE data from UE 422. Additionally depicted, AP 412 and AP can receive UE data from UE 424. As such, via communication over network 490, nodal AP controller component 450 can receive UE data for UE 420 from AP 410 and AP 412, other UE data for UE 422 from AP 410, AP 412, and AP 414, and additional UE data for UE 424 from AP 412 and AP 414. Additionally, nodal AP controller component 450 can receive AP data for AP 410, AP 412 and AP 414. Selection component 440 can then employ this UE data and AP data to select UE-AP resource pairs for UE(s) 420-424 and AP resources correspondingly associated with AP 410-414. In an aspect, AP resources associated with AP 414 would not be allocated to UE 420 because AP 414 is out of range of, UE 420. Similarly, AP resources associated with AP 410 would not be allocated to UE 424 because AP 410 is out of range of, UE 424. Moreover, AP resources associated with APs 410-414 could be allocated to UE 422 because APs 410-414 are all in range of, UE 422.

In some embodiments, nodal AP controller component 450 can be located remotely from one or more of AP components 410-414. As an example, AP component 410 can be located in a first city, AP components 412-414 can be located in a second city, and nodal AP controller component 450 can be located in a third city and be communicatively coupled to AP components 410-414 via network 490 This aspect of the disclosed subject matter can allow centralization of nodal AP controller component 450. AP components 410-414 can, in an aspect, be viewed as 'remote radio heads' or 'thin AP components', e.g., where AP components 410-414 each embody Layer 1 functionality, Layers 2-7 can be embodied and/or virtualized at nodal AP controller component 450. In an embodiment, therefore, nodal AP controller component 450 can act as Layer 2-7 for a plurality of 'remote radio heads,' e.g., AP components 410-414. Nodal AP controller component 450 can, via selection component 440, generate ATD 430 for any number of UE-AP pair selections based on information comprised in UE data 420 and AP data, not illustrated for brevity.

In other embodiments, nodal AP controller component 450 can be located local to an AP component, e.g., AP component(s) 410-414. As an example, nodal AP controller component 450 can be located at a campus server and can interact with AP components 410-414 located at various campus buildings and coupled to AP devices in the various classrooms of the campus buildings. Nodal AP controller component 450 and the AP components 410-414 can be communicatively coupled via a campus LAN, e.g., network 490. In some embodiments, nodal AP controller component 450 can be co-located with an AP component, e.g., 410-414. In some of these embodiments, nodal AP controller component 450 can also be communicatively coupled with other AP components located locally or remotely, e.g., where AP component 410 is local to nodal AP controller component 450, nodal AP controller component 450 can further be coupled to another AP component, e.g., 412-414 located, for example, at a branch campus facility, etc.

Token(s) 430-434 can comprise information enabling a UE, e.g., UE(s) 420-424, to initiate a communicative link between an AP resource and the UE, wherein the AP resource is selected via selection component 440. The communicative link between the UE and the AP device can comprise a designated resource of the AP. The communicative link with the AP device can be responsive to requested resource characteristics that can be comprised in UE data, e.g., from UE 420-424, which characteristics can be communicated to selection component 440. In an aspect, Token(s) 430-434 can enable resource-sensitive selection of a UE-AP resource pair with regard to forming a communicative link between UE(s) 420-424 and corresponding AP device(s). Token(s) 430-434 can be generated by nodal AP controller component 450, via selection component 440. In some embodiments, Token(s) 430-434 generated by nodal AP controller component 450 can be received by UE(s) 420-424 via corresponding AP component(s) 410-414, e.g., nodal AP controller component 450 can generate token(s) 430-434 and send them back through AP component(s) 410-414 to UE(s) 420-424. In other embodiments, token(s) 430-434 can be received by UE(s) 420-424 via another component, for example, token(s) 430-434 can be communicated to UE(s) 420-424 from nodal AP controller component 450 via an internet component, a carrier-side component, etc.

In an aspect, token(s) 430-434 can comprise UE data, in whole or in part. In some embodiments, token(s) 430-434 can comprise UEID information. Further, token(s) 430-434 can comprise AP data, in whole or in part. Moreover, token(s) 430-434 can comprise information related to a selected UE-AP resource pairing. In some embodiments, token(s) 430-434 can comprise information related to a plurality of UE-AP resource pairings, which can comprise resource parings for UE(s) 420-424 with different APs, parings for UE(s) 420-424 with different resources of an AP, parings for a plurality of UEs 420-424 with different APs, parings for a plurality of UEs 420-424 with different resources of an AP, no paring for UE(s) 420-424 with an AP or AP resource, etc. As such, token(s) 430-434 can be generated for one UE (e.g., from UE 420-424) and one AP device, for multiple UEs 420-424 and one AP device, for one UE and multiple AP devices, etc., wherein the AP device(s) can have one or more resources, the UE(s) 420-424 can be associated with one or more requested resource, and wherein a rule related to selecting an AP resource in response to a UE requested resource has been satisfied. Of note, in some embodiments, where token 430 comprises UE-AP pair information for the several UEs 420-424, tokens 432-434 may not be generated, e.g., each of UEs 420-424 can receive token 430 having all the pairing info needed. In other embodiments, token(s) 430-434 can comprise UE-AP resource pairing info for specific UE(s) 420-424 such that each UE receives a corresponding token with pairing info specific to that UE.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
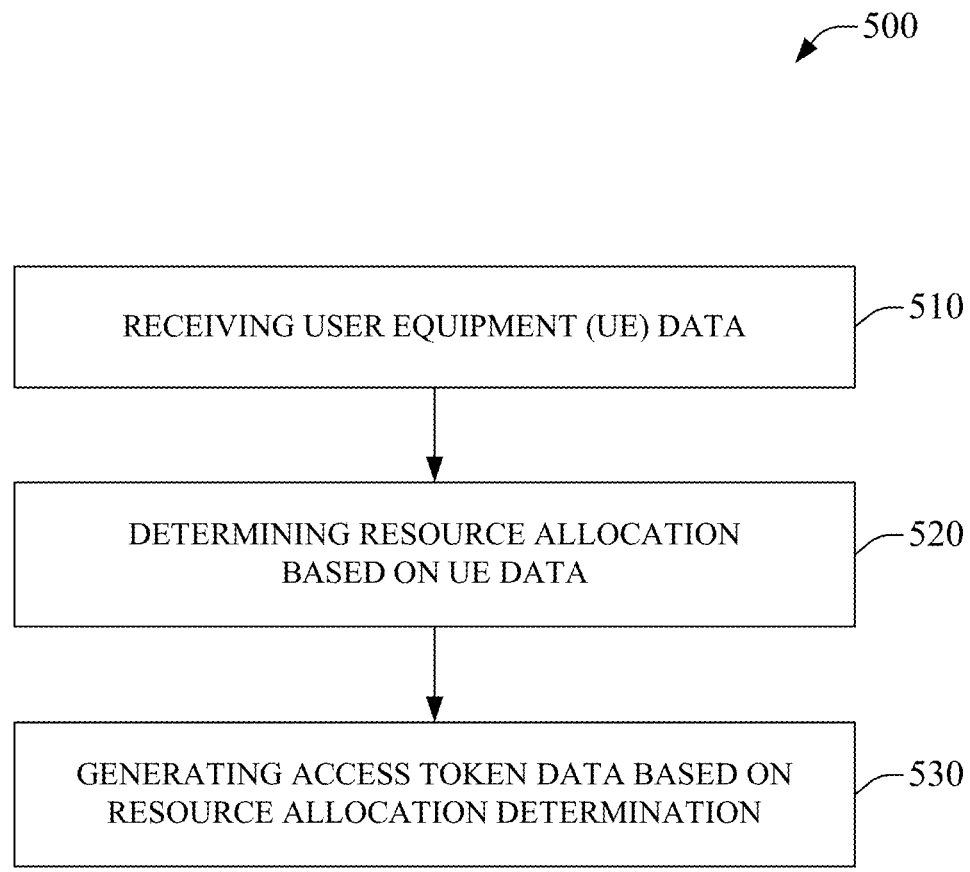
FIG. 5 illustrates an example method facilitating resource-sensitive access point selection in accordance with aspects of the subject disclosure.

FIG. 5 illustrates a method 500 facilitating resource-sensitive access point selection in accordance with aspects of the subject disclosure. At 510, method 500 can include receiving user equipment (UE) data. UE data can include UEID information, historical UE information, UE location information (e.g., location, proximity, etc.), UE requested resource information (e.g., current resource characteristic, minimum resource characteristic, ideal resource characteristic, anticipated resource characteristic, historical resource characteristic, etc.), UE state information (e.g., charging, idle, active, background apps running, etc.), UE provider information, UE subscription plan information, UE environmental information, or nearly any other type of UE related information. UE data can be employed with AP data to select a UE-AP pair, wherein AP data can include APID information, historical AP information, AP location information, AP available resource information (e.g., currently available, anticipated available, historically available, whitelists, blacklists, etc.), AP state information, AP carrier information, AP environmental information, or nearly any other type of AP related information. An AP can include devices or components enabling a communicative link between an AP component and a UE component, e.g., a Wi-Fi AP, femto/pico/microcell, NodeB, eNodeB, Bluetooth AP, point of sale (POS) component including IR, NFC, or other types of POS AP, etc. A UE can correspondingly be a mobile device, smartphone, tablet computer, wearable computing device, smart credit/debit card component, laptop, vehicular computing device, etc.

At 520, method 500 can comprise, determining resource allocation based on the UE data received at 510. Determining resource allocation can comprise applying a rule related to selection of a resource, e.g., an AP resource, in view of characteristics of the resource requested by a UE and characteristics of a resource that is available via an AP. In an aspect, the rule can consider current, historical, and/or anticipated resource characteristics. As an example, historical information for an AP resource can indicate that the resource is associated with strong encryption of communicated data, which can be considered in view of any request for an encrypted resource from a UE. As another example, an AP resource can be anticipated to be available through a designated time, such as where a maintenance schedule indicates that the AP resource will be unavailable after the time for maintenance. This anticipated service window can be employed in selecting an appropriate UE-AP pairing. Nearly any other historical characteristic and/or anticipated future characteristic for an AP resource can be employed in the determining resource allocation of 520, and all such characteristics are considered within the scope of the present disclosure. Moreover, similar application of historical and anticipated characteristics of UE requested resources can be similarly employed. As an example, where a UE historically follows a pattern of resource usage, such as low bandwidth usage between 8 am and 9 am and then high bandwidth usage from 9 am to 10 am when the UE is located at location X, this historical information can be employed to anticipate future UE resource request characteristics based on time and location such that an appropriate UE-AP resource pair can be designated in conjunction with the UE location and time.

At 530, method 500 can comprise, generating access token data (ATD) that can enable selection of a UE-AP pair with regard to forming a communicative link between a UE and an AP component. At this point, method 500 can end. ATD can comprise information enabling a UE to initiate a communicative link with a selected AP. The communicative link with the AP can be directed to a designated resource of the AP. The communicative link with the AP can be responsive to requested resource characteristics that can be indicated via UE data. In an aspect, ATD can enable resource-sensitive selection of a UE-AP pair with regard to forming a communicative link between the UE and the AP. In some embodiments, ATD can be received by a UE via an AP component. In other embodiments, ATD can be received by a UE via another component, for example, ATD can be communicated to a UE from via a carrier backbone network to the UE, etc. In an aspect, ATD can comprise UE data, in whole or in part. In some embodiments, ATD can comprise UEID information. Further, ATD can comprise AP data, in whole or in part. Moreover, ATD can comprise information related to a selected UE-AP pairing. In some embodiments, ATD can comprise information related to a plurality of UE-AP pairings, which can comprise parings for a UE with different APs, parings for a UE with different resources of an AP, parings for a plurality of UEs with different APs, parings for a plurality of UEs with different resources of an AP, no paring for a UE with an AP or AP resource, etc. As such, ATD can be generated for one UE and one AP device, for multiple UEs and one AP device, for one UE and multiple AP devices, etc., wherein the AP device(s) can have one or more resources, the UE(s) can be associated with one or more requested resource, and wherein a rule related to selecting an AP resource in response to a UE requested resource has been satisfied.

Figure 6:
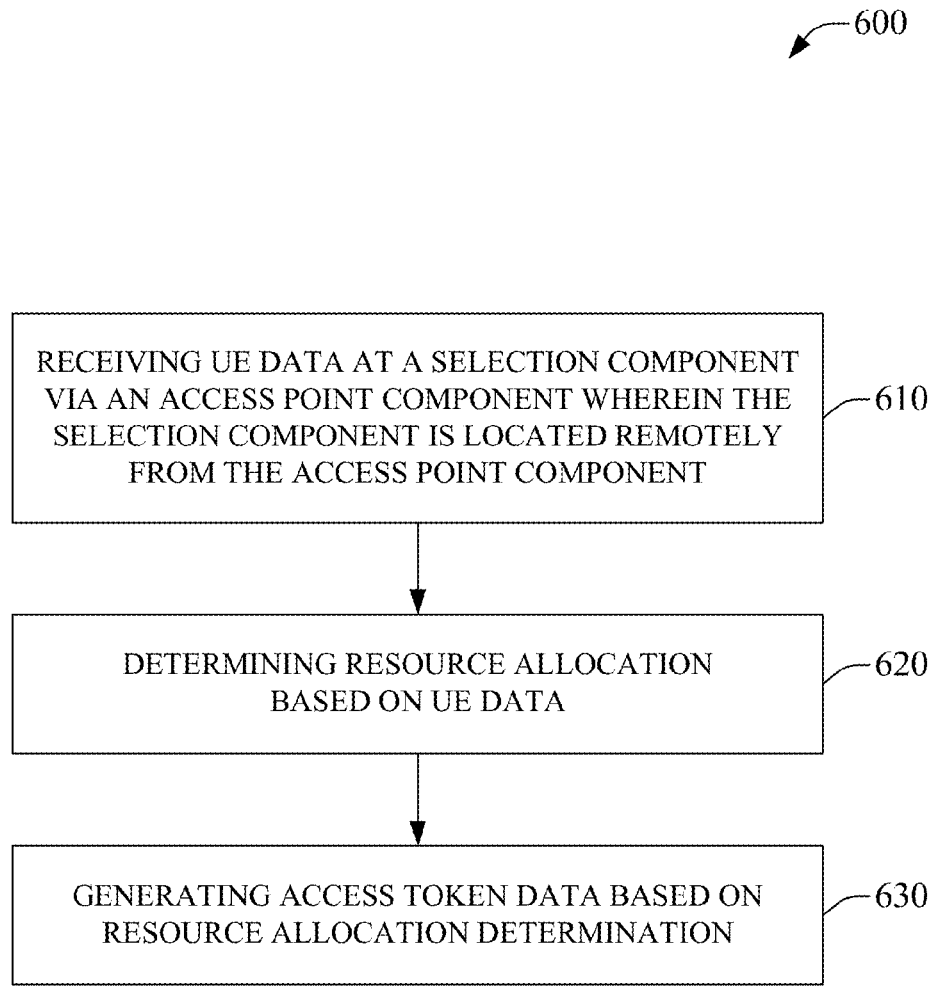
FIG. 6 illustrates an example method facilitating resource-sensitive access point selection based on UE data received via an AP component in accordance with aspects of the subject disclosure.

FIG. 6 illustrates a method 600 facilitating resource-sensitive access point selection based on UE data received via an AP component in accordance with aspects of the subject disclosure. At 610, method 600 can include receiving UE data at a selection component via an access point component. The selection component can be located remotely from the access point component. UE data can include UEID information, historical UE information, UE location information, UE requested resource information, UE state information, UE provider information, UE subscription plan information, UE environmental information, or nearly any other type of UE related information. The UE data can be employed with AP data to select a UE-AP pair, wherein AP data can include APID information, historical AP information, AP location information, AP available resource information, AP state information, AP carrier information, AP environmental information, or nearly any other type of AP related information. An AP can include devices or components enabling a communicative link between an AP component and a UE component.

At 620, method 600 can comprise, determining resource allocation based on the UE data received by the selection component at 610. Determining resource allocation can comprise applying a rule related to selection of a resource, e.g., an AP resource, in view of characteristics of the resource requested by a UE and characteristics of a resource that is available via an AP. In an aspect, the rule can consider current, historical, and/or anticipated resource characteristics. Nearly any historical characteristic and/or anticipated future characteristic for an AP resource can be employed in the determining resource allocation of 620. Moreover historical and anticipated characteristics of UE requested resources can be employed.

At 630, method 600 can comprise, generating an ATD that can enable selection of a UE-AP pair with regard to forming a communicative link between a UE and an AP component. At this point, method 600 can end. ATD can comprise information used to enable a UE to initiate a communicative link with a selected AP. The communicative link with the AP can be directed to a designated resource of the AP. The communicative link with the AP can be responsive to requested resource characteristics that can be indicated via UE data. In an aspect, ATD can enable resource-sensitive selection of a UE-AP pair with regard to forming a communicative link between the UE and the AP. In some embodiments, ATD can be received by a UE via an AP component. In other embodiments, ATD can be received by a UE via another component, for example, ATD can be communicated to a UE from via a carrier backbone network to the UE, etc. In an aspect, ATD can comprise UE data, in whole or in part. In some embodiments, ATD can comprise UEID information. Further, ATD can comprise AP data, in whole or in part. Moreover, ATD can comprise information related to a selected UE-AP pairing. In some embodiments, ATD can comprise information related to a plurality of UE-AP pairings, which can comprise parings for a UE with different APs, parings for a UE with different resources of an AP, parings for a plurality of UEs with different APs, parings for a plurality of UEs with different resources of an AP, no paring for a UE with an AP or AP resource, etc. As such, ATD can be generated for one UE and one AP device, for multiple UEs and one AP device, for one UE and multiple AP devices, etc., wherein the AP device(s) can have one or more resources, the UE(s) can be associated with one or more requested resource, and wherein a rule related to selecting an AP resource in response to a UE requested resource has been satisfied.

Figure 7:
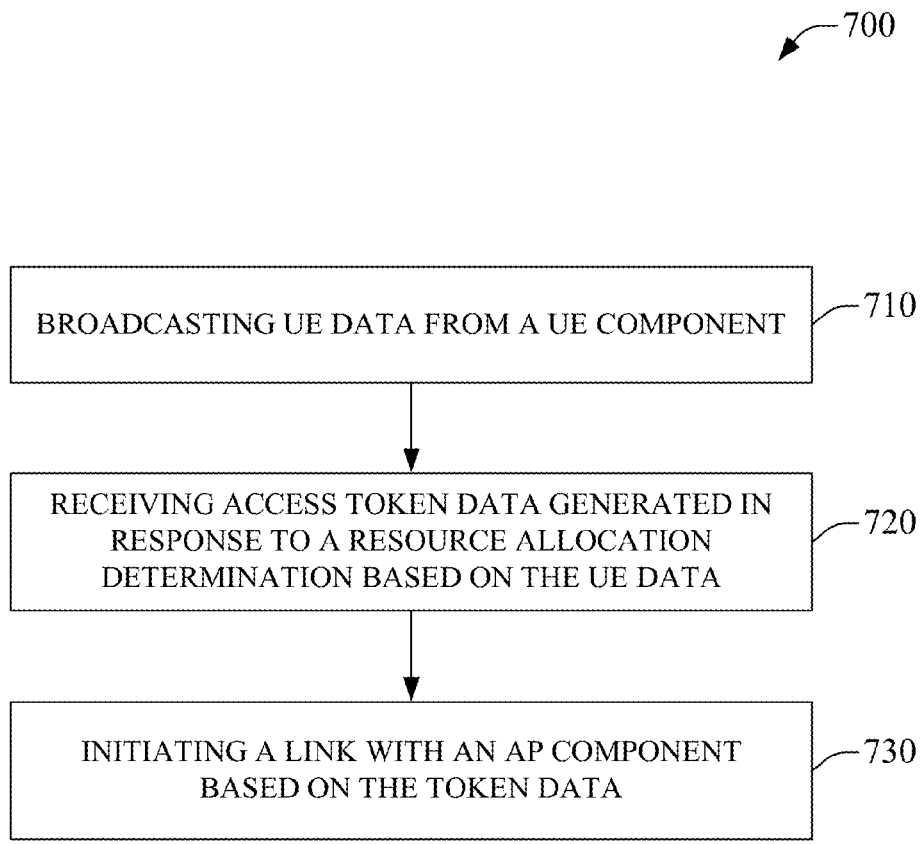
FIG. 7 depicts an example method facilitating resource-sensitive token-based access point selection via a UE component in accordance with aspects of the subject disclosure.

FIG. 7 illustrates a method 700 that facilitates resource-sensitive token-based access point selection via a UE component in accordance with aspects of the subject disclosure. At 710, method 700 can include broadcasting UE data from a UE component. UE data can include UEID information, historical UE information, UE location information, UE requested resource information, UE state information, UE provider information, UE subscription plan information, UE environmental information, or nearly any other type of UE related information. The UE data can be employed with AP data to select a UE-AP pair, wherein AP data can include APID information, historical AP information, AP location information, AP available resource information, AP state information, AP carrier information, AP environmental information, or nearly any other type of AP related information. An AP can include devices or components enabling a communicative link between an AP component and a UE component. Broadcasting UE data from a UE can comprise transmitting UE data in a manner that allows an AP component to receive the UE data. The AP component can then make some or all of the UE data available for selection of a UE-AP resource pair.

At 720, method 700 can comprise, receiving ATD that can be generated in response to a resource allocation determination based on the UE data. In an aspect, the ATD can be received at the UE from another device or component. As an example, AP component 110, selection component 240, etc., can generate the ATD and can make it available to be received by the UE at 720. In some embodiments, the ATD can be received by a UE at 720 via an AP component. In other embodiments, ATD can be received by a UE at 720 via another component, for example, ATD can be communicated to a UE from via a carrier backbone network to the UE, etc.

At 730, the UE can initiate a link with an AP component based on the ATD. At this point, method 700 can end. The ATD received at 720 can enable selection of a UE-AP pair with regard to forming a communicative link between a UE and an AP component wherein the ATD can comprise information used to enable a UE to initiate a communicative link with a selected AP. The ATD can comprise information related to establishing a communicative link with an AP with access to a designated resource of the AP. As such, the communicative link with the AP can be responsive to requested resource characteristics that can be indicated via UE data broadcast at 710. In an aspect, ATD can comprise UE data from 710, in whole or in part. In some embodiments, ATD can comprise UEID information. Further, ATD can comprise AP data, in whole or in part. Moreover, ATD can comprise information related to a selected UE-AP pairing. In some embodiments, ATD can comprise information related to a plurality of UE-AP pairings, which can comprise parings for a UE with different APs, parings for a UE with different resources of an AP, parings for a plurality of UEs with different APs, parings for a plurality of UEs with different resources of an AP, no paring for a UE with an AP or AP resource, etc. As such, ATD can be generated for one UE and one AP device, for multiple UEs and one AP device, for one UE and multiple AP devices, etc., wherein the AP device(s) can have one or more resources, the UE(s) can be associated with one or more requested resource, and wherein a rule related to selecting an AP resource in response to a UE requested resource has been satisfied.

Figure 8:
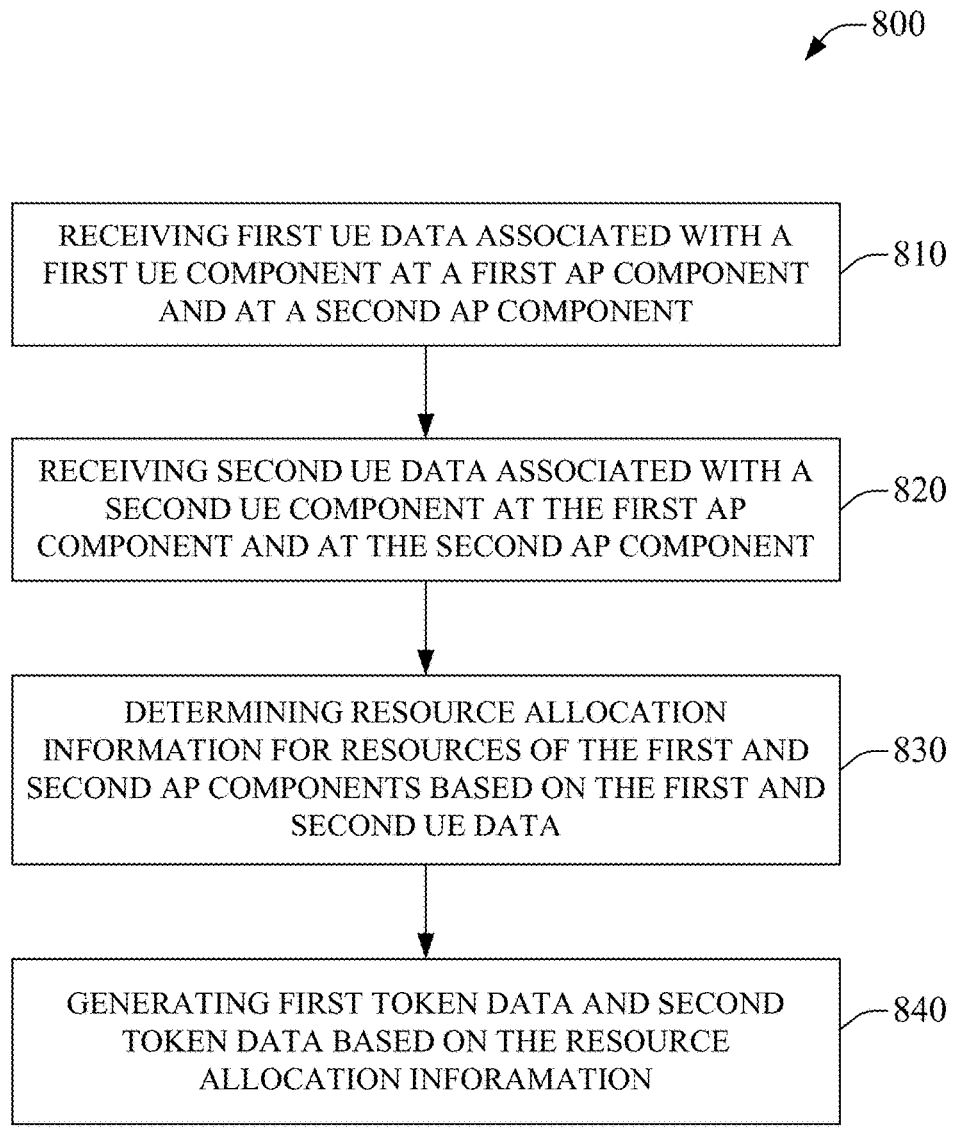
FIG. 8 illustrates an example method facilitating resource-sensitive access point selection for a plurality of AP components in accordance with aspects of the subject disclosure.

FIG. 8 illustrates a method 800 that facilitates resource-sensitive access point selection for a plurality of AP components in accordance with aspects of the subject disclosure. At 810, method 800 can include receiving first UE data associated with a first UE component. The first UE data can be received at a first AP component and at a second UE component. At 820, method 800 can comprise, receiving second UE data associated with a second UE component. The second UE data can be received at the first AP component and at the second UE component. The first and second UE data can include UEID information, historical UE information, UE location information, UE requested resource information, UE state information, UE provider information, UE subscription plan information, UE environmental information, or nearly any other type of UE related information, corresponding to the first or second UE. Generally, UE data can be employed with AP data to select a UE-AP pair, wherein AP data can include APID information, historical AP information, AP location information, AP available resource information (e.g., currently available, anticipated available, historically available, whitelists, blacklists, etc.), AP state information, AP carrier information, AP environmental information, or nearly any other type of AP related information. An AP can include devices or components enabling a communicative link between an AP component and a UE component.

At 830, method 800 can comprise, determining resource allocation for resources of the first and second AP components based on the first and second UE data received at 810 and 820. Determining resource allocation can comprise applying a rule related to selection of a resource, e.g., an AP resource associated with either first AP component or second AP component, in view of characteristics of a resource requested by a UE, e.g., the first or second UE, and characteristics of a resource that is available via an AP. In an aspect, the rule can consider current, historical, and/or anticipated resource characteristics. Nearly any historical characteristic and/or anticipated future characteristic for an AP, and nearly any historical and anticipated characteristics of UE requested resources, resource can be employed in the determining resource allocation of 830, and all such characteristics are considered within the scope of the present disclosure.

At 840, method 800 can comprise, generating first token data and second token data based on the resource allocation information determined at 830. At this point, method 800 can end. First token data and second token data can enable selection of a UE-AP pair with regard to forming a communicative link between a UE, e.g., the first UE and/or the second UE, and an AP component, e.g., an AP associated with the first and/or second AP component.

The tokens can comprise information enabling a UE to initiate a communicative link with a selected AP. The communicative link with the AP can be directed to a designated resource of the AP. The communicative link with the AP can be responsive to requested resource characteristics that can be indicated via UE data. In an aspect, token data can enable resource-sensitive selection of a UE-AP pair with regard to forming a communicative link between the UE and the AP. In some embodiments, the first and/or second token data can be received by a UE via an AP component. In other embodiments, the first and/or second token data can be received by a UE via another component, for example, the first token data can be communicated to the first UE component via a carrier core-network component, etc.

In an aspect, the first and/or second token data can comprise UE data, in whole or in part. In some embodiments, the first and/or second token data can comprise UEID information. Further, the first and/or second token data can comprise AP data, in whole or in part. Moreover, the first and/or second token data can comprise information related to a selected UE-AP pairing. In some embodiments, the first and/or second token data can comprise information related to a plurality of UE-AP pairings, which can comprise parings for a UE with different APs, parings for a UE with different resources of an AP, parings for a plurality of UEs with different APs, parings for a plurality of UEs with different resources of an AP, no paring for a UE with an AP or AP resource, etc. As such, the first and/or second token data can be generated for one UE and one AP device, for multiple UEs and one AP device, for one UE and multiple AP devices, etc., wherein the AP device(s) can have one or more resources, the UE(s) can be associated with one or more requested resource, and wherein a rule related to selecting an AP resource in response to a UE requested resource has been satisfied. Of note, in some embodiments, where a token comprises UE-AP pair information for the several UEs, e.g., the first and second UE components, other tokens may not be generated, e.g., first and second UE components can receive first token data having all the pairing info needed and, as such, second token data can be redundant and need not be generated at 840. In other embodiments, the first and second tokens can comprise UE-AP resource pairing info for specific UEs, e.g., first and second UE components respectively, such that each UE receives a respective token with pairing info specific to that UE, e.g., first UE component gets first token data generated at 840, and second UE component gets second token data generated at 840.

Figure 9:
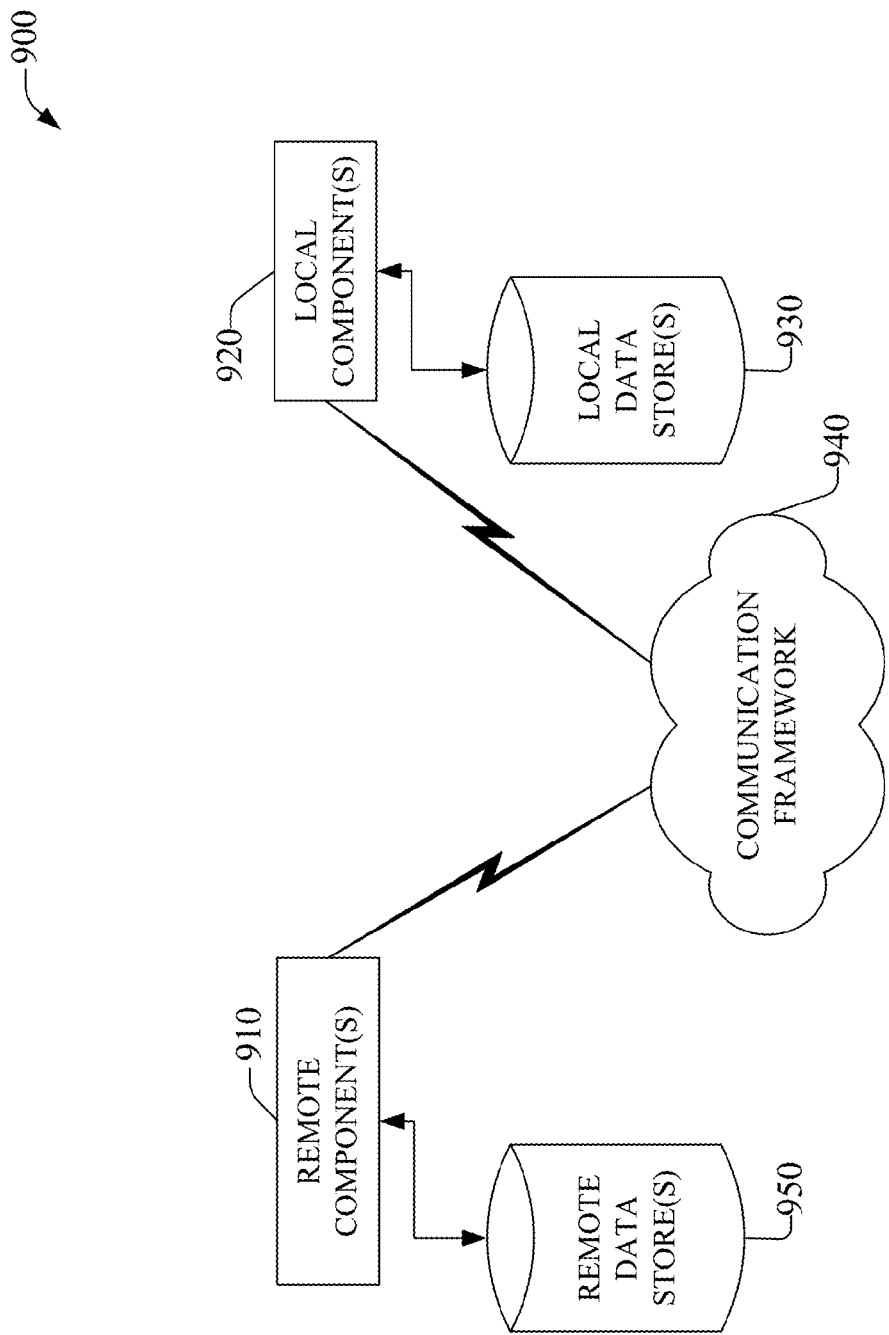
FIG. 9 depicts an example schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be selection component 240, 340, 440, nodal AP controller component 350, 450, etc.

The system 900 also includes one or more local component(s) 920. The local component(s) 920 can be hardware and/or software (e.g., threads, processes, computing devices). In some embodiments, local component(s) 920 can include, for example, AP component 110, 210, 310, 410, 412, 414, UE 420, 422, 424, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
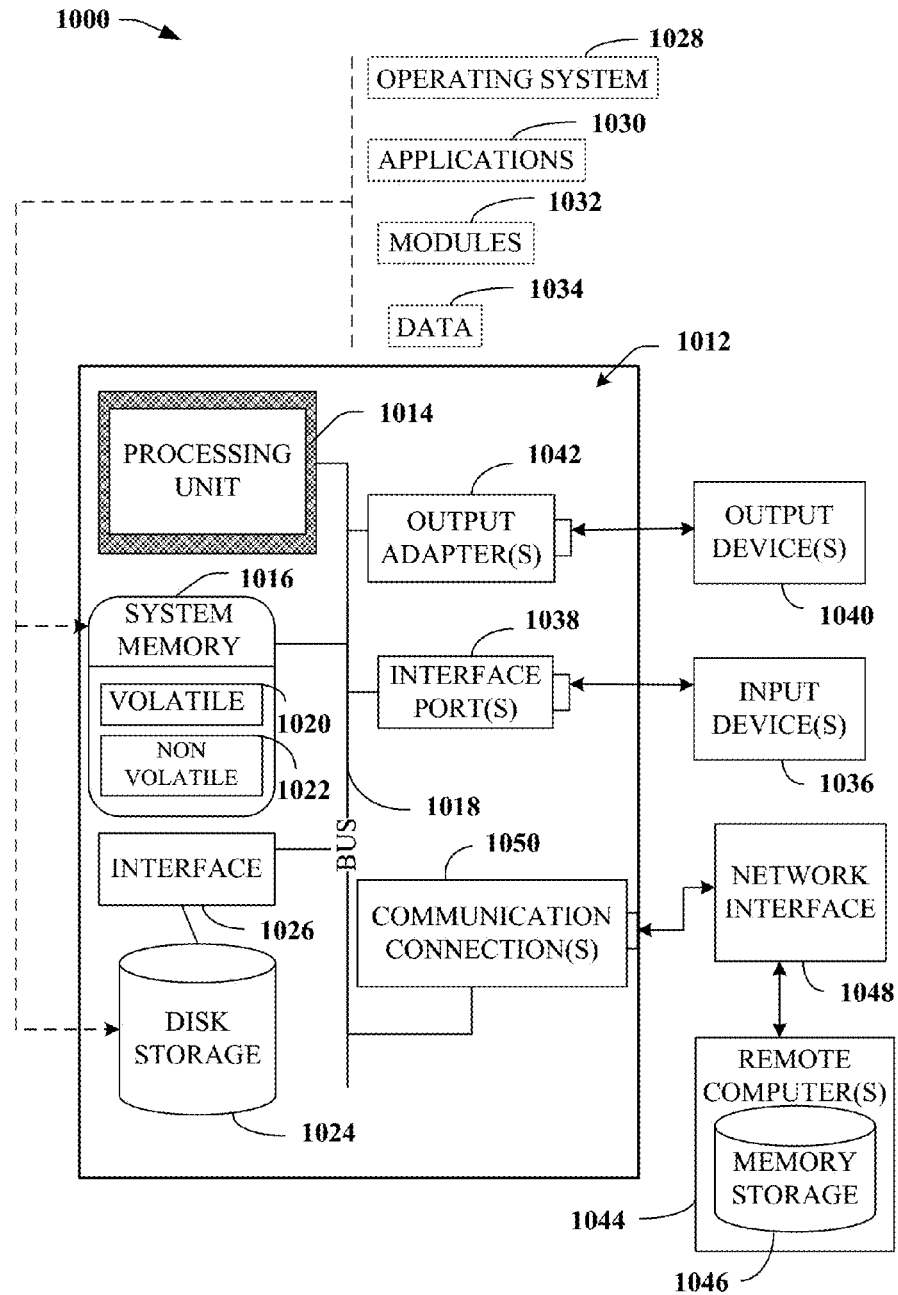
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of selection component 240, 340, 440, nodal AP controller component 350, 450, AP component 110, 210, 310, 410, 510, UE 420, 422, 424, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: transmitting a request for data via an air interface or other wireless interface to a remote device, e.g., AP component, 210, 310, 410, 412, 414, etc., wherein the request is related to receiving data by the system, e.g., selection component 240, 340, 440, nodal AP controller component 350, 450, etc., via the wireless interface, and in response to the transmitting the request, receiving data by the system via the wireless interface from the remote device, wherein: the data was received by the remote device from another device, e.g., local data store associated with AP component, 210, 310, 410, 412, 414, etc., associated with storing the data before being received by the system, the receipt of the data by the remote device is associated with a lower latency and a higher throughput than a latency and a throughput, respectively, of the wireless interface between the system and the remote device, and the data is received by the system, as a result of a push of the data by the remote device, without an additional request by the system.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user preference information, etc., and can be embodied in a touch sensitive display panel, a mouse input GUI, a command line controlled interface, etc., allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, vehicle subsystems, such as headlights, brake lights, stereos, vehicle information sharing device, etc., can include an output adapter 1042 to enable use in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving a first request for resource allocation associated with a first user equipment, wherein the first request for resource allocation is received from the first user equipment independent of the first user equipment having received information about an access point device prior to the first request for resource allocation having been received;
        determining a first fitness metric value related to provisioning a first resource via the access point device;
        provisioning the first resource, for utilization by the first user equipment via the access point device, based on the first fitness metric value; and
        enabling access by the first user equipment to the first resource via the access point device in response to the provisioning of the first resource.

2. The system of claim 1, further comprising:
    receiving a second request for resource allocation from a second user equipment, wherein the second request for resource allocation is received from the second user equipment independent of the second user equipment having received information about the access point in advance of the second request for resource allocation having been received, and determining a second fitness metric value related to provisioning a second resource via the access point device, wherein the provisioning the second resource is further based on the first fitness metric value and the second fitness metric value.

3. The system of claim 2, wherein the provisioning the other resource is based on the first fitness metric value and the second fitness metric value.

4. The system of claim 1, wherein the access point device comprises the system.

5. The system of claim 1, wherein the system is not the access point device.

6. The system of claim 5, wherein the system and the access point device are communicatively coupled via a network device of a network.

7. The system of claim 1, wherein the access point device is a point of sale transaction device employing an air interface for communication with the first user equipment.

8. The system of claim 7, wherein electronic components of a credit card comprise the first user equipment.

9. The system of claim 8, wherein the point of sale transaction device and the electronic components of the credit card communicate via a near field communication protocol.

10. The system of claim 1, wherein the enabling the access by the first user equipment to the first resource comprises using access token data associated with an access token generated by the system.

11. The system of claim 10, wherein the access token data is sent to the first user equipment via a device other than the access point device.

12. A method, comprising:

receiving, by a system comprising a processor, user equipment data associated with a user equipment and comprising an indication of a requested wireless communication resource, wherein the user equipment data is received from the user equipment independent of the user equipment having received access point data related to an access point device;

based on the user equipment data and the access point data, determining, by the system, pair information related to pairing of the user equipment and an access point resource of the access point device; and generating, by the system, access token data based on the user equipment data, the access point data, and the pair information, wherein the access token data enables the user equipment to initiate a wireless link to the access point device to employ the access point resource.

13. The method of claim 12, wherein:

the user equipment is a first user equipment;

the user equipment data is a first user equipment data;

the access point resource is a first access point resource; and the indication of the requested wireless communication resource is a first indication of a first requested wireless communication resource, wherein:

the first user equipment data is further associated with a second user equipment and comprises a second indication of a second requested wireless communication resource, and wherein the access token data enables the first user equipment to initiate the wireless link to the access point device to employ the first access point resource and enables the second user equipment to initiate a different wireless link to the access point device to employ a second access point resource.

14. The method of claim 12, wherein the receiving the user equipment data by the system comprises receiving the user equipment data by the access point device.

15. The method of claim 12, wherein the receiving the user equipment data by the system comprises receiving the user equipment data by a selection device other than the access point device, and wherein the selection device and access point device are connected via a network device.

16. The method of claim 12, wherein the access point device is a Wi-Fi access point device.

17. The method of claim 12, wherein access point device is a femtocell device.

18. A non-transitory computer-readable storage medium comprising executable instructions that, when executed by a processor, facilitate performance of operations, comprising:

generating a wireless communication resource request prior to a user equipment receiving access point data related to an access point device;

receiving resource data associated with enabling the user equipment to initiate a wireless link to the access point device to employ a resource of the access point device, wherein the resource data is generated in response to determining, by a device other than the user equipment, pair information related to pairing of the user equipment and the access point device to enable the user equipment to employ the resource based on access point data and the wireless communication resource request; and initiating access to the resource data by the user equipment based on the resource data.

19. The non-transitory computer-readable storage medium of claim 18, wherein the receiving the resource data comprises receiving the resource data via the device other than the access point device.

20. The non-transitory computer-readable storage medium of claim 18, wherein the receiving the resource data comprises receiving the resource data via the access point device.

* * * * *